US006696697B2

United States Patent
Enomoto

(10) Patent No.: US 6,696,697 B2
(45) Date of Patent: Feb. 24, 2004

(54) ROUGHNESS MEASURING METHOD AND APPARATUS, USING A FILTER HAVING A PLURALITY OF CUTOFF VALUES

(75) Inventor: Masato Enomoto, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 121 days.

(21) Appl. No.: 09/956,952

(22) Filed: Sep. 21, 2001

(65) Prior Publication Data
US 2002/0038854 A1 Apr. 4, 2002

(30) Foreign Application Priority Data

Sep. 29, 2000 (JP) ........................................ 2000-299670

(51) Int. Cl.⁷ .............................................. G01N 21/86
(52) U.S. Cl. ..................................... 250/559.22; 73/105
(58) Field of Search ........................ 250/559.04, 559.22, 250/306, 307; 73/104, 105; 33/503, 504; 702/150, 151

(56) References Cited

U.S. PATENT DOCUMENTS 5,390,536 A * 2/1995 Zhang et al. ................. 73/105

FOREIGN PATENT DOCUMENTS

DE   198 17 406 C1   2/2000

OTHER PUBLICATIONS

"Geometrical Product Specifications (GPS)—Surface tecture: Profile method—Rules and procesdures for the assessment of surface texture", ISO 4288:1996 (E).

"Surface roughness—Definitions and designation", JIS B 0601–1994, translated and published by Japanese Standards Association.

* cited by examiner

Primary Examiner—Thanh X. Luu
(74) Attorney, Agent, or Firm—Oliff & Berridge, PLC

(57) ABSTRACT

The roughness measuring method and roughness measuring apparatus enable accurate measurement of the surface roughness of a work with no cutoff values specified. An auxiliary storage device storing therein a plurality of cutoff values is included in a data processing apparatus of the roughness measuring apparatus. These cutoff values are read by a CPU. Then, the CPU uses a filter having a plurality of cutoff values to calculate a plurality of temporary evaluation values for each evaluation length corresponding to a plurality of cutoff values from measurement data, and obtains a maximum value out of these temporary evaluation values. Then, the CPU controls an evaluation value outputting device to have this maximum value outputted to a monitor as an effective evaluation value of the roughness of the measurement area in the cutoff value with the calculated maximum value falling within its roughness range.

4 Claims, 10 Drawing Sheets

F I G. 2
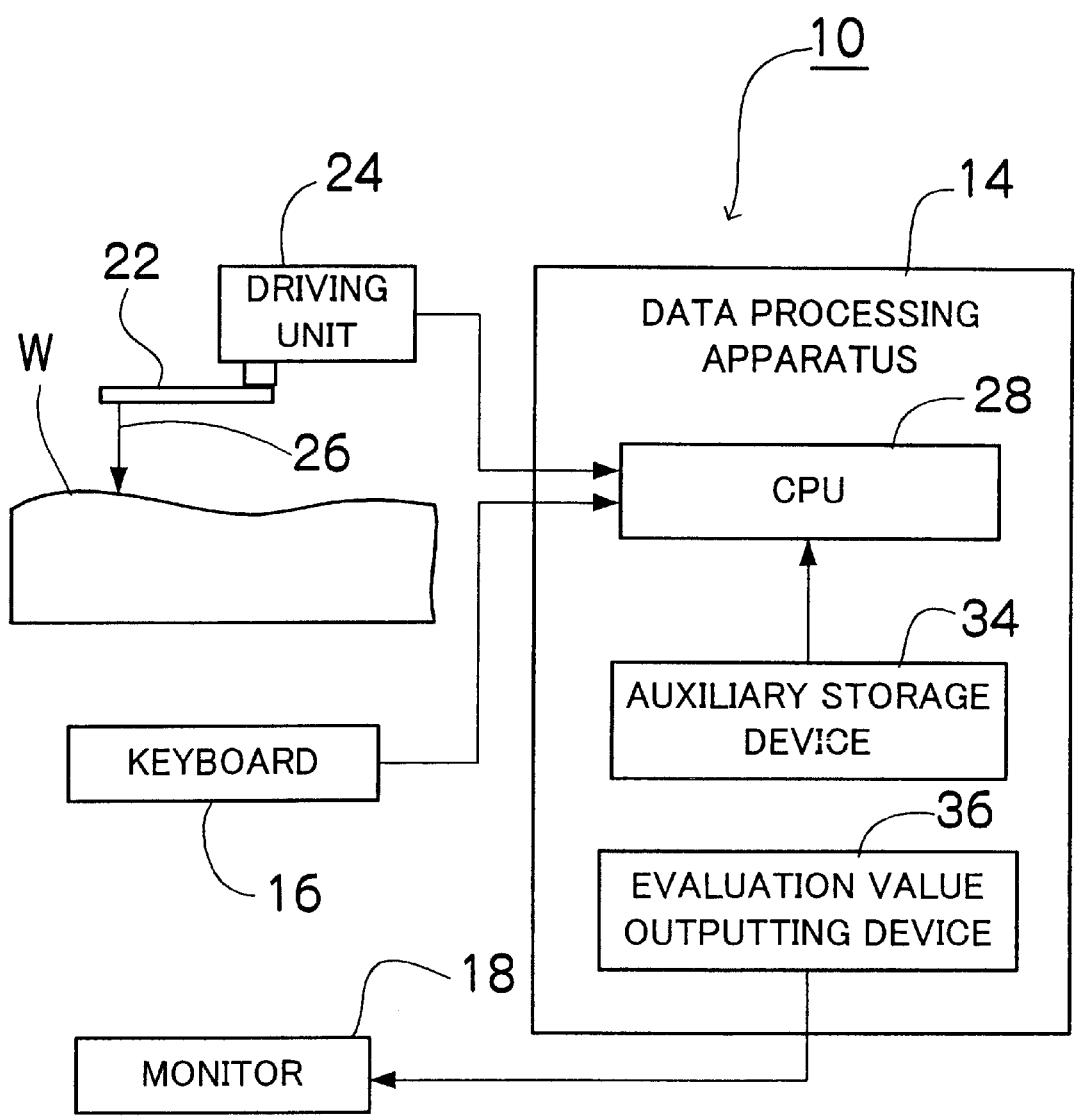

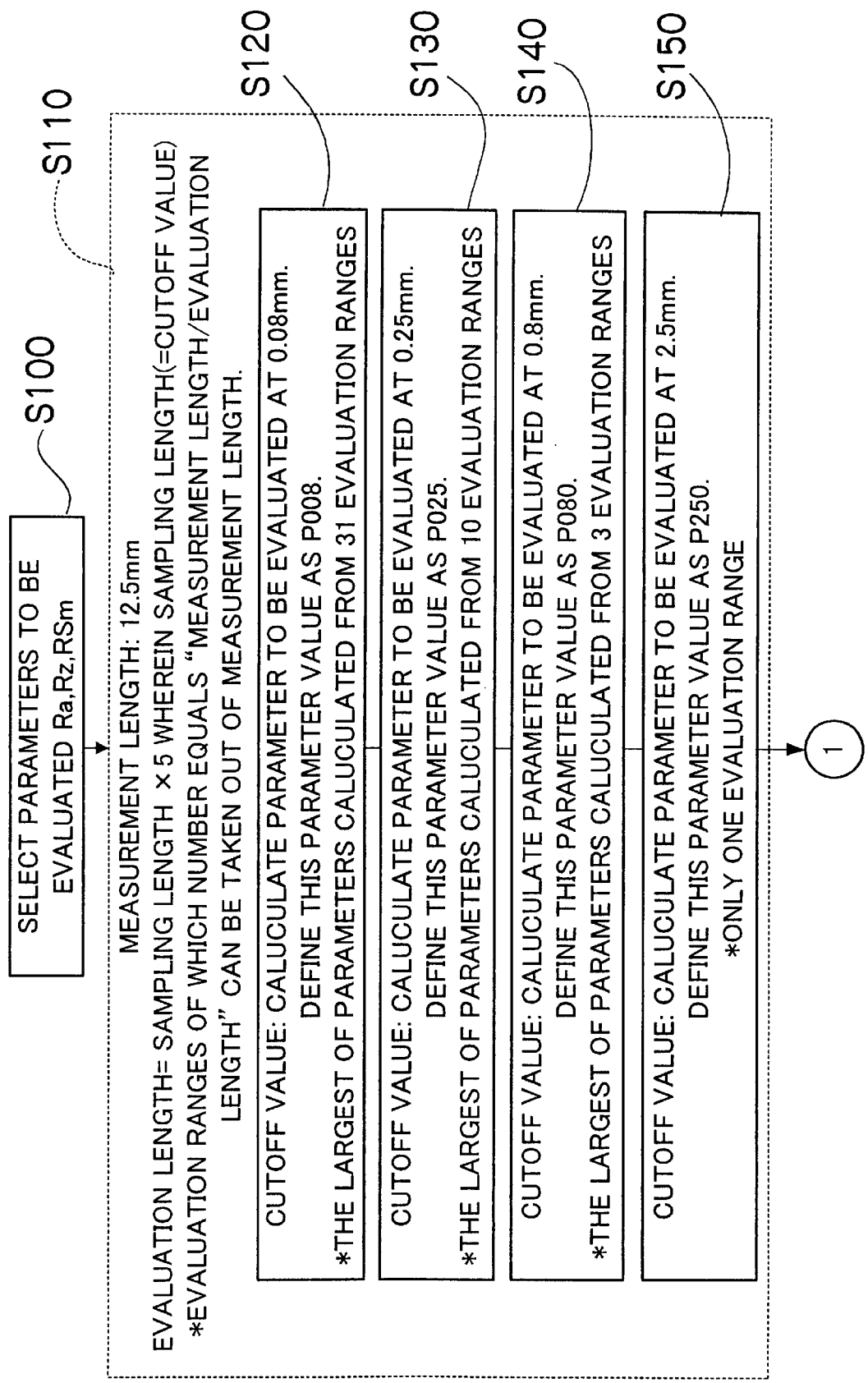

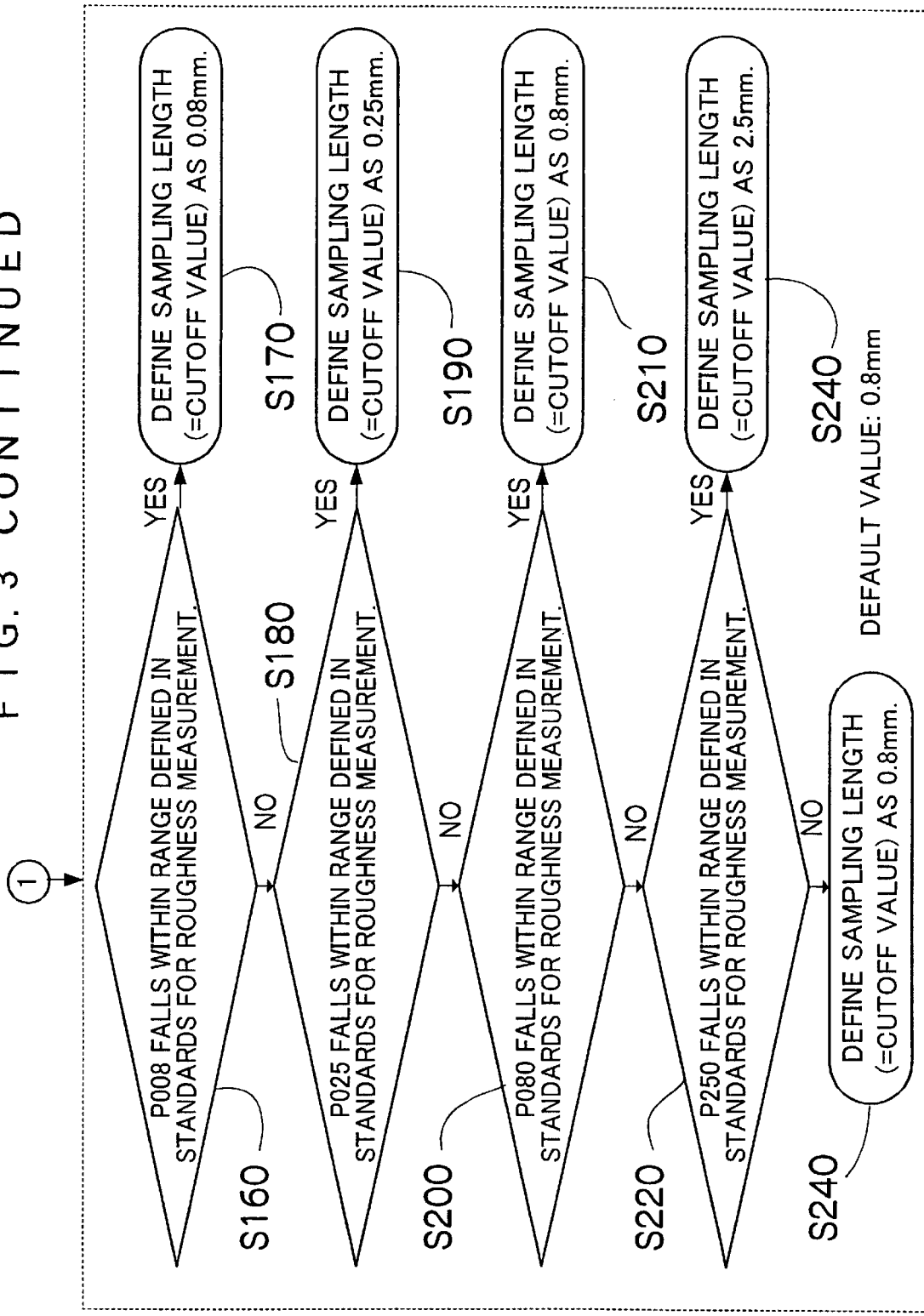

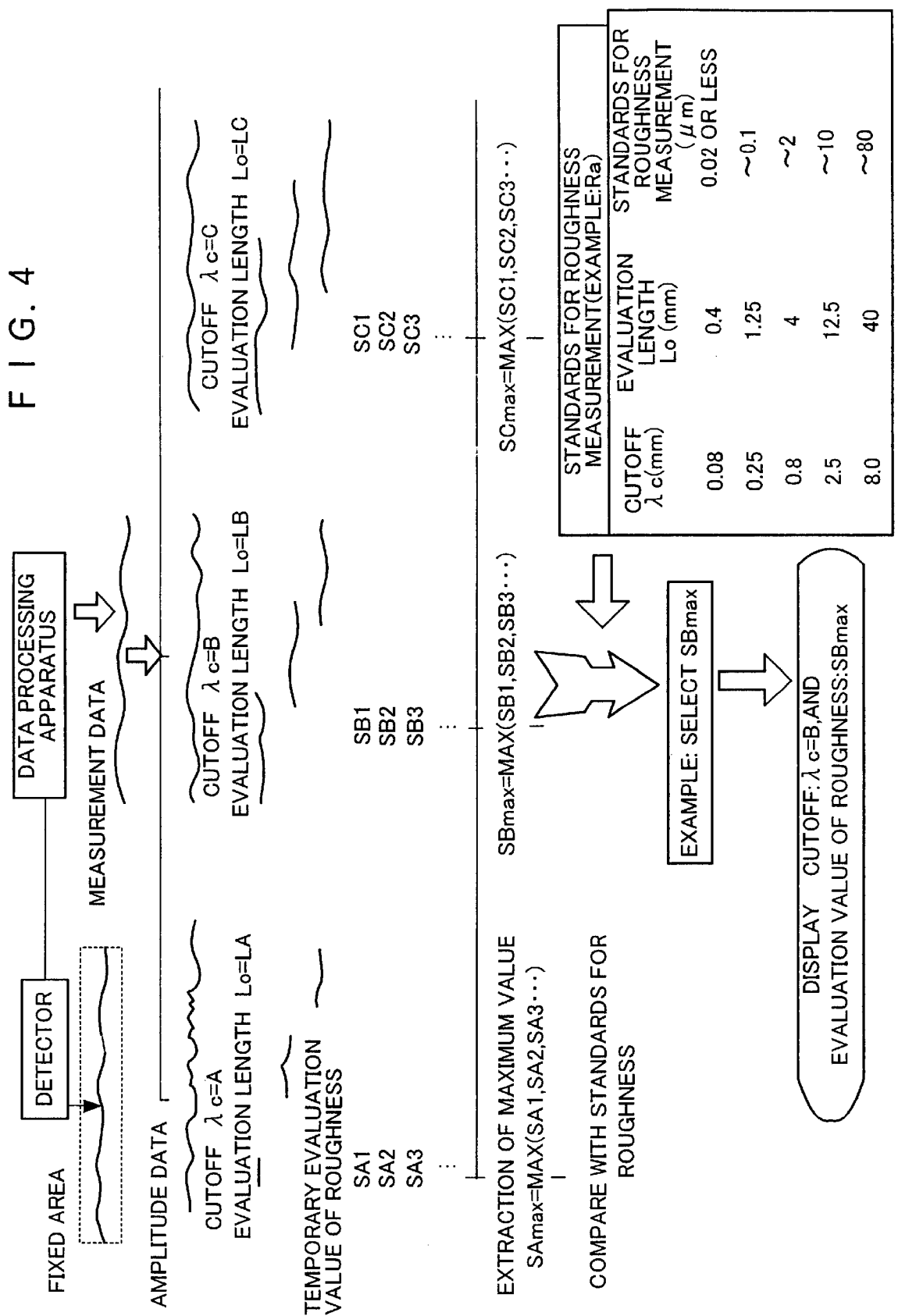

FIG. 5

Table 1 — Roughness sampling lengths for the measurement of Ra, Rq, Rsk, Rku, RΔq and curves and related parameters for non-periodic profiles (for example ground profiles)

| $Ra$<br>μm | Roughness sampling length<br>$lr$<br>mm | Roughness evaluation length<br>$ln$<br>mm |
|---|---|---|
| (0,006) < $Ra$ ≤ 0,02 | 0,08 | 0,4 |
| 0,02 < $Ra$ ≤ 0,1 | 0,25 | 1,25 |
| 0,1 < $Ra$ ≤ 2 | 0,8 | 4 |
| 2 < $Ra$ ≤ 10 | 2,5 | 12,5 |
| 10 < $Ra$ ≤ 80 | 8 | 40 |

F I G. 6

Table 2 — Roughness sampling lengths for the measurement of Rz, Rv, Rp, Rc and Rt of non-periodic profiles (for example ground profiles)

| $Rz^{1)}$ $Rz1$max.$^{2)}$ µm | Roughness sampling length $lr$ mm | Roughness evaluation length $ln$ mm |
|---|---|---|
| (0,025) < Rz, Rz1max. ≤ 0,1 | 0,08 | 0,4 |
| 0,1 < Rz, Rz1max. ≤ 0,5 | 0,25 | 1,25 |
| 0,5 < Rz, Rz1max. ≤ 10 | 0,8 | 4 |
| 10 < Rz, Rz1max. ≤ 50 | 2,5 | 12,5 |
| 50 < Rz, Rz1max. ≤ 200 | 8 | 40 |

1) Rz is used when measuring Rz, Rv, Rp, Rc and Rt.
2) Rz1max. is used only when measuring Rz1max., Rv1max., Rp1max. and Rc1max.

FIG. 7

Table 3 — Roughness sampling length for the measurement of R-parameters of periodic profiles, and RSm of periodic and non-periodic profiles

| RSm<br>µm | Roughness sampling length<br>$l_r$<br>mm | Roughness evaluation length<br>$l_n$<br>mm |
|---|---|---|
| 0,013 < RSm ≤ 0,04 | 0,08 | 0,4 |
| 0,04 < RSm ≤ 0,13 | 0,25 | 1,25 |
| 0,13 < RSm ≤ 0,4 | 0,8 | 4 |
| 0,4 < RSm ≤ 1,3 | 2,5 | 12,5 |
| 1,3 < RSm ≤ 4 | 8 | 40 |

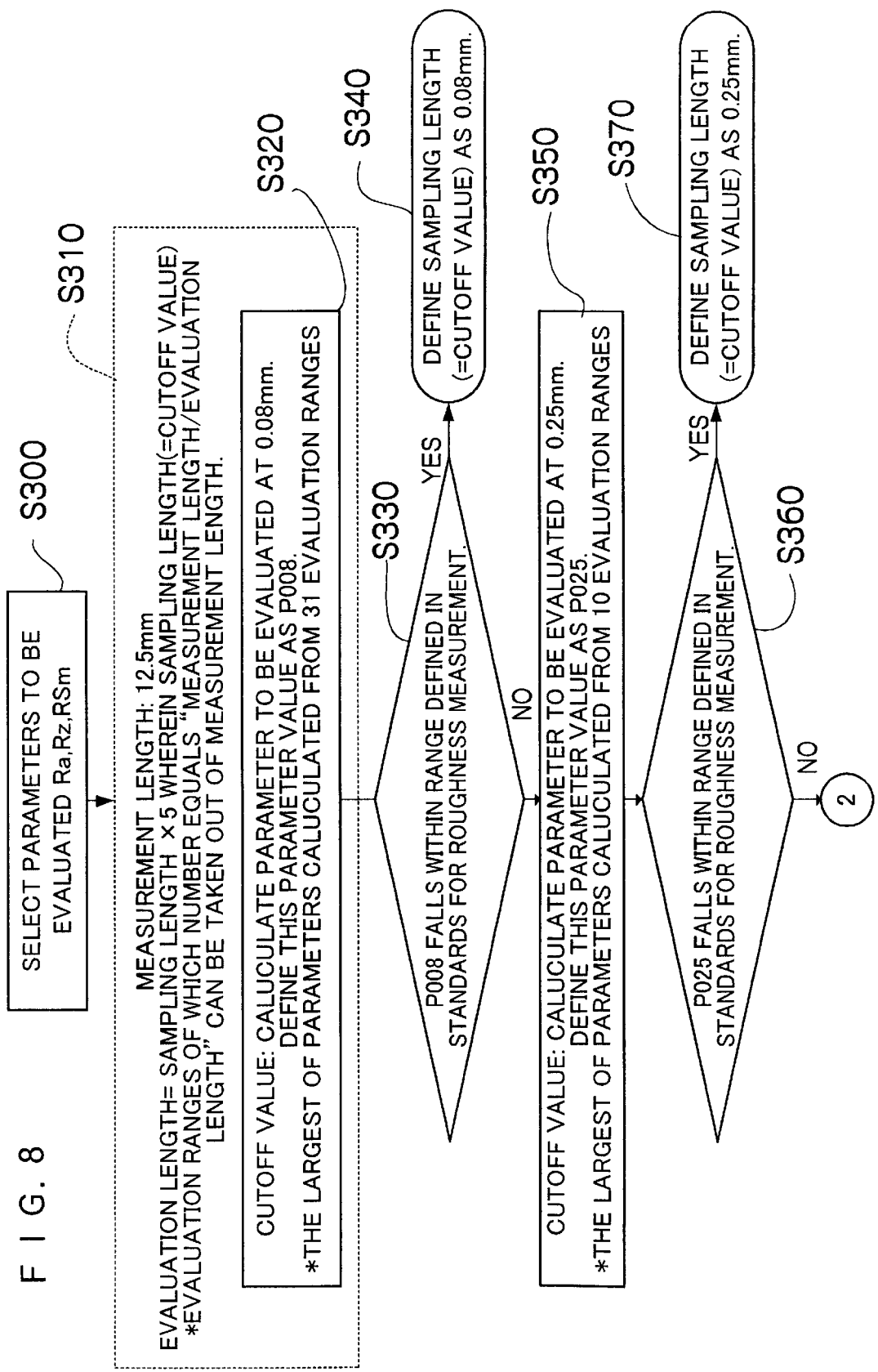

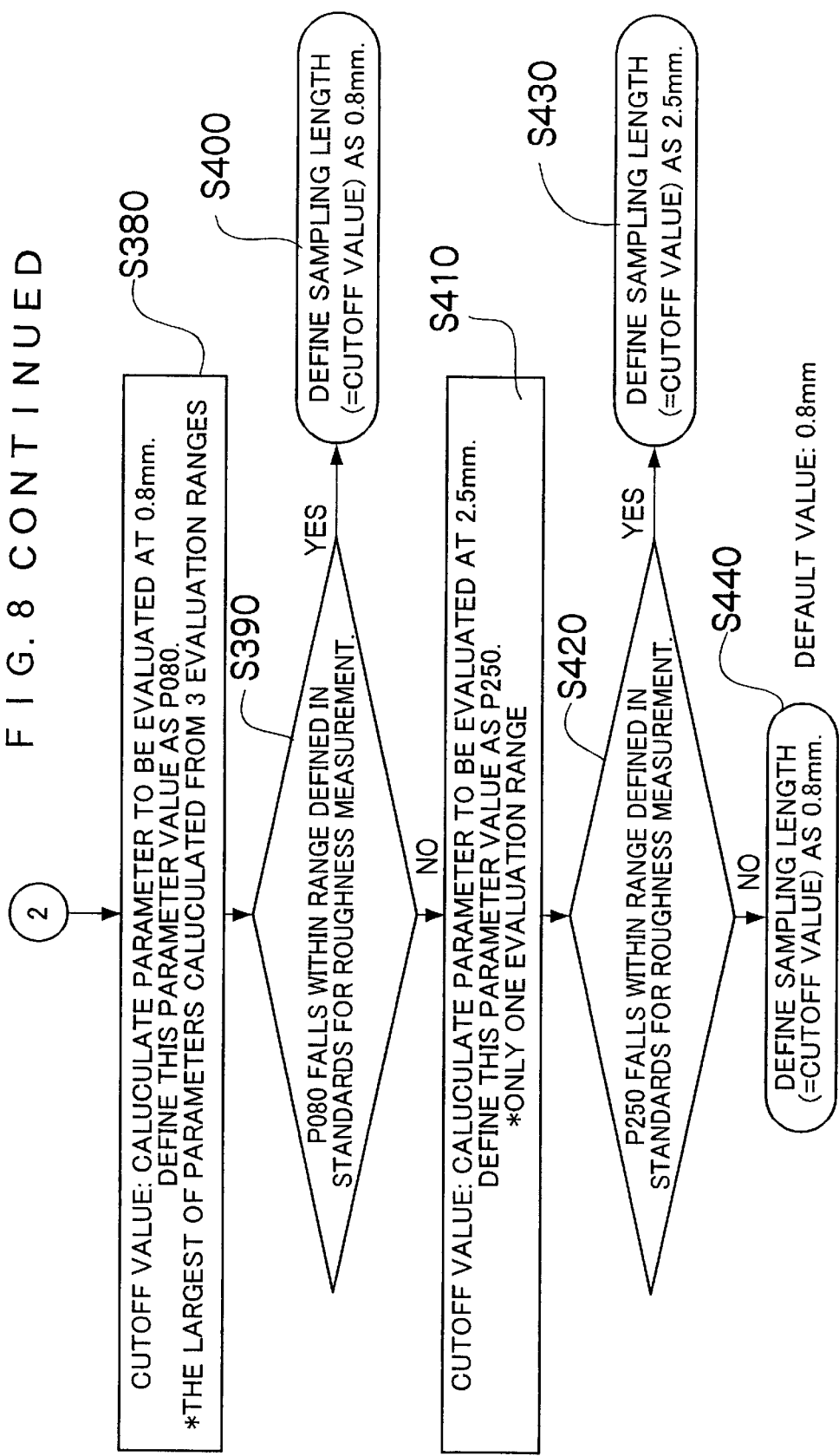

ROUGHNESS MEASURING METHOD AND APPARATUS, USING A FILTER HAVING A PLURALITY OF CUTOFF VALUES

BACKGROUND OF THE INVENTION

1. Field of the Invention

The present invention relates to roughness measuring method and apparatus, and particularly relates to roughness measuring method and apparatus which enable measurement based on industrial standards of the surface roughness of a work with no cutoff values specified.

2. Description of the Related Art

A surface roughness measuring apparatus is used for inspecting the finished quality of the surface of a processed work. At this time, inspecting standard values (standard values such as cutoff values, parameters to be evaluated, and tolerance limits for parameter values) are indicated in drawings of instructions for processing the work, and the surface roughness of the work is measured according to these inspecting standard values.

However, selection of cutoff values may be difficult if inspecting standard values are not indicated in the drawing of instructions for processing the work, or a work with the surface shape significantly changed due to secular variation after processing, or a work with no drawings attached thereto such as a purchased product.

Then, in consideration of such cases, industrial standards in various countries are defined such that the magnitudes of parameters (Ra, Rz and RSm) to be evaluated are estimated to select a cutoff value being a sampling length for measurement (ISO 4288, JIS B 0601, etc.).

On the other hand, in a roughness measuring method disclosed in German Patent DE19817406C1, the evaluation length is defined to be five times as large as the cutoff value, and is outputted as an effective evaluation value in the cutoff value if the magnitude of the parameter calculated after the measurement of the evaluation length falls within the range of roughness of the cutoff value.

However, in the roughness measuring method disclosed in German Patent DE19817406C1, one evaluation value calculated in one measurement range is determined as an effective estimation value, thus raising a disadvantage that the reliability of the effective estimation value is low, and therefore the surface roughness of the work cannot be measured accurately.

SUMMARY OF THE INVENTION

The present invention has been developed in view of such circumstances, and has as its object the provision of a roughness measuring method and a roughness measuring apparatus enabling the surface roughness of a work with no cutoff values specified to be measured accurately.

For attaining the above-described objects, the present invention is characterized in that a measurement area of surface roughness of a work is specified, the total range of the specified measurement area is measured to obtain measurement data showing the surface roughness of the work, a filter having a plurality of predefined cutoff values is used to calculate a plurality of temporary evaluation values for each evaluation length corresponding to the plurality of cutoff values from the measurement data, thereby obtaining a maximum value of the temporary evaluation values, the maximum value is obtained as an effective evaluation value if the maximum value falls within the roughness range of the cutoff value used at that time, and a different cutoff value is used to obtain an effective evaluation value if the maximum value does not fall within the roughness range of the cutoff value used at that time.

Also, for achieving the above-described objects, the present invention is directed to a roughness measuring apparatus, comprising: a stylus which comes into contact with a surface of a work; a measurement area specifying device which specifies a measurement area of surface roughness of the work; a measurement data obtaining device which moves the stylus across a total range of the measurement area specified by the measurement area specifying device to obtain measurement data showing the surface roughness of the work; a maximum value obtaining device which uses a filter having a plurality of predefined cutoff values to calculate a plurality of temporary evaluation values for each evaluation length corresponding to the plurality of cutoff values from the measurement data obtained by the measurement data obtaining device, thereby obtaining a maximum value of the plurality of temporary evaluation values; and an evaluation value outputting device which obtains the maximum value as an effective value if the maximum value obtained by the maximum value obtaining device falls within a roughness range of the cutoff value used at that time, and uses a different cutoff value to obtain and output an effective evaluation value if the maximum value does not fall within the roughness range of the cutoff value used at that time.

According to the present invention, a measurement area of surface roughness of a work is first specified by a measurement area specifying device. Then, the total range of the specified measurement area is measured by a measurement data obtaining device to obtain measurement data showing the surface roughness of the work. Then, a filter having a plurality of predefined cutoff values is used to calculate a plurality of temporary evaluation values for each evaluation length corresponding to the plurality of cutoff values from the measurement data, and a maximum value is obtained from these temporary evaluation values by a maximum value obtaining device. Then, if the maximum value falls within the range of the cutoff value used at that time, an evaluation value outputting device outputs this maximum value as an effective evaluation value of the roughness of the measurement area. Also, if the maximum value does not fall within the range of the roughness of the cutoff value used at that time, a different cutoff value is used to obtain and output the effective evaluation value.

In this way, in the present invention, since the effective evaluation value is determined from a plurality of evaluation values, reliability of the effective evaluation value is high compared to conventional techniques in which the effective evaluation value is determined by one evaluation value, thus making it possible to measure the surface roughness of the work accurately.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a block diagram showing a configuration of a roughness measuring apparatus shown in FIG. 1;

FIG. 3 is a flowchart showing a first embodiment of a roughness measuring method;

FIG. 4 illustrates diagrammatically the flowchart shown in FIG. 3;

FIG. 5 shows a relation between a range of Ra and an evaluation length for a cutoff value;

FIG. 6 shows a relation between a range of Rz and evaluation length for the cutoff value;

FIG. 7 shows a relation between a range of RSm and evaluation length for the cutoff value; and FIG. 8 is a flowchart showing a second embodiment of the roughness measuring method.

DETAILED DESCRIPTION OF THE PREFERRED EMBODIMENTS

Figure 1:
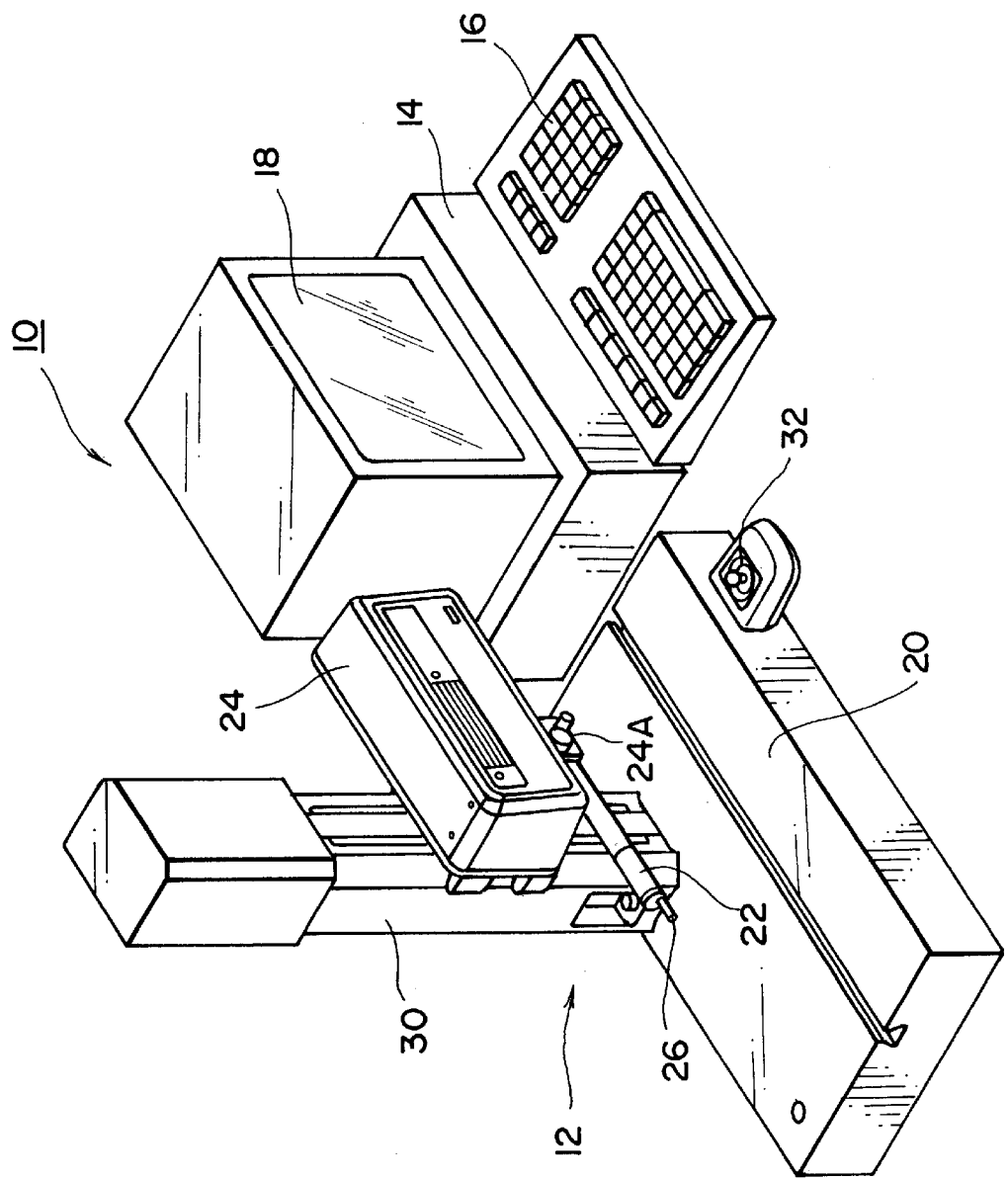
FIG. 1 is a general view showing a roughness measuring apparatus of an embodiment.

Hereunder, preferred embodiments of a roughness measuring method and a roughness measuring apparatus according to the present invention will be described in detail in accordance with the accompanying drawings.

A roughness measuring apparatus 10 of the embodiment shown in FIG. 1 is constituted by a measurement unit 12, a data processing apparatus 14, an input device (keyboard: measurement area specifying device) 16 and a monitor 18. The measurement unit 12 has a pickup 22 for measuring the surface roughness of a work W placed on a table 20, which is shown in FIG. 2, and this pickup 22 is supported by a holder 24A of a driving unit 24.

The pickup 22 has a stylus 26 in its tip, and displacement of this stylus 26 is transformed into voltage through a differential transformer transducer (not shown) included in the driving unit 24. Then, this voltage value is subjected to A/D conversion by an A/D converter, and is outputted to a CPU (measurement data obtaining device, maximum value obtaining device) 28 of the data processing apparatus 14. Thereby, measurement data showing the surface roughness of the work W is obtained by a CPU 16.

The driving unit 24 is mounted on a column 30 placed straight on the table 20 as in FIG. 1, and a motor is driven in accordance with instructions from the CPU 28 in FIG. 2, whereby the entire driving unit 24 is moved up and down along the column 30, and the holder 24A is moved from side to side. Furthermore, the driving unit 24 may also be operated by a joy stick 32 placed in the front face of the table 20.

The data processing apparatus 14 as shown in FIG. 2 includes an auxiliary storage device 34 such as an EEPROM, which is a hard disk or a read only memory enabling electrical erase and write. Four types of cutoff values defined in standards (0.08, 0.25, 0.8, 2.5 (mm)) are stored in this auxiliary storage device 34, and these cutoff values are read by the CPU 28. Then, the CPU 28 uses a filter having the plurality of cutoff values to calculate a plurality of temporary evaluation values for each evaluation length corresponding to the plurality of cutoff values from the measurement data, and obtains a maximum value from these temporary evaluation values. Then, the CPU 28 controls an evaluation value outputting device 36 to have this maximum value outputted to the monitor 18, with the maximum value determined as an effective evaluation value of the roughness of the measurement area in the cutoff value with the calculated maximum value falling within its roughness range.

Then, functions of the roughness measuring apparatus 10 configured as described above will now be described, referring to the flowchart of FIG. 3, and the diagrammatic sketch of FIG. 4 diagrammatically illustrating the flowchart of FIG. 3.

According to FIG. 3, parameters to be evaluated (Ra, Rz and RSm) are first selected (S100). Furthermore, if a plurality of parameters is selected, a parameter that is most frequently used is generally given a higher priority to have the effective evaluation value of the parameter outputted first. In ISO, for example, they are prioritized in the order of Ra→Rz→RSm.

Then, the keyboard 16 is used to set the measurement length (measurement area) is at 12.5 mm (S110). Also, in embodiments, the evaluation length is set to be a length five times as large as the sampling length (cutoff value), which is defined in ISO 4288. Thus, estimation units whose number equals the "measurement length/evaluation length" may be taken from the measurement length if overlap with each estimation range is avoided. Furthermore, the measurement length is not limited to 12.5 mm, and may be changed according to estimated roughness.

Then, the total range of the specified measurement length is measured to obtain measurement data showing the surface roughness of the work as shown in FIG. 4.

Then, the parameter to be evaluated is calculated at the cutoff value of 0.08 mm as shown in FIG. 3. This parameter value is defined as P008. Furthermore, since 31 (12.5/(0.08×5)≈31) evaluation ranges can be taken at this time, the maximum parameter value (SAmax in FIG. 4) is obtained out of 31 parameter values calculated for each of 31 evaluation ranges (temporary evaluation value: SA1, SA2, SA3 . . . in FIG. 4) (S120).

Similarly, the parameter to be evaluated is calculated at the cutoff value of 0.25 mm. This parameter value is defined as P025. Since 10 evaluation ranges can be taken at this time, the maximum parameter value (SBmax in FIG. 4) is obtained out of 10 parameter values calculated for each of 10 evaluation ranges (temporary evaluation value: SB1, SB2, SB3 . . . in FIG. 4) (S130).

Similarly, the parameter to be evaluated is calculated at the cutoff value of 0.8 mm. This parameter value is defined as P080. Since 3 evaluation ranges can be taken at this time, the maximum parameter value is obtained out of 3 parameter values calculated for each of 3 evaluation ranges (temporary evaluation value) (S140).

Similarly, the parameter to be evaluated is calculated at the cutoff value of 2.5 mm. This parameter value is defined as P250. Since 1 evaluation range can be taken at this time, the parameter value (temporary estimation value) is obtained as the maximum value (S150).

Furthermore, since one temporary value insures only low reliability, the measurement length is changed from 12.5 mm to, for example, 15.0 mm, and the evaluation starting point is shifted by a predetermined amount as Lo=Lc of λc=C in FIG. 4 to take a plurality of evaluation ranges (3 ranges in the case of FIG. 4). Thereby, a plurality of temporary evaluation values (3 values) can be obtained, and the reliability of the temporary evaluation value is thus improved.

Then, it is determined whether or not the maximum value of P008 falls within the roughness ranges of Tables 1 to 3 ($0.006 < Ra \leq 0.02$, $0.025 < Rz$, $Rz1max \leq 0.2$, $0.013 < RSm \leq 0.04$) shown in FIGS. 5 to 7 as defined in ISO 4288 (S160), and if this maximum value falls within the range, the maximum value is outputted as an effective evaluation value of the measurement area, with the cutoff value defined as 0.08 mm (S170).

On the other hand, in the case where the maximum value does not fall within the roughness range of P008, it is determined whether or not the maximum value of P025 falls within the roughness ranges of Tables 1 to 3 ($0.02 < Ra \leq 0.1$, 0.1<Rz, Rzlmax≦0.5, 0.04<RSm≦0.13) (S180), and if this maximum value falls within the range, the maximum value is outputted as an effective evaluation value of the measurement area, with the cutoff value defined as 0.25 mm (S190).

Also, in the case where the maximum value does not fall within the roughness range of P025, it is determined whether or not the maximum value of P080 falls within the roughness ranges of Tables 1 to 3 (0.1<Ra≦2, 0.5<Rz, Rzlmax≦10, 0.13<RSm≦0.4) (S200), and if this maximum value falls within the range, the maximum value is outputted as an effective evaluation value of the measurement area, with the cutoff value defined as 0.8 mm (S210).

Also, in the case where the maximum value does not fall within the roughness range of P080, whether or not the maximum value of P250 falls within the roughness ranges of Tables 1 to 3 (2<Ra≦10, 10<Rz, Rzlmax≦50, 0.4<RSm≦1.3) is determined (S220), and if this maximum value falls within the range, the maximum value is outputted as an effective evaluation value of the measurement area, with the cutoff value defined as 2.5 mm (S230).

Furthermore, in the case where the maximum value does not fall within the roughness range of P250, 0.8 mm that is the most general value is set to be a cutoff value (S240).

In this way, in the roughness measuring method of the embodiment, a plurality of temporary evaluation values for each evaluation length corresponding to the plurality of cutoff values is calculated from measurement data, and the maximum value is obtained from these temporary evaluation values. Then, this maximum value is outputted as an effective evaluation value of roughness of the measurement area, in the cutoff value with this maximum value falling within its roughness range.

Therefore, in the measuring apparatus 10 of the embodiment, the effective evaluation is determined from a plurality of temporary evaluation values, the reliability of the effective evaluation value is high compared to conventional techniques in which the effective evaluation value is determined with one evaluation value, thus making it possible to measure the surface roughness of the work accurately.

Furthermore, in the flowchart of FIG. 3, the maximum values of parameter values (temporary evaluation values) of P008, P025, P080 and P250 are calculated in advance, and thereafter the effective evaluation value is determined from these four maximum values, but as shown in the flowchart of FIG. 8, the maximum value of parameter values (temporary evaluation values) may be calculated for each of P008, P025, P080 and P250 to determine the effective evaluation value.

According to the flowchart of FIG. 8, parameters to be evaluated (Ra, Rz, RSm) are first selected (S300). Also in this case, as in the case of the measuring method in FIG. 3, if a plurality of parameters is selected, a parameter that is most frequently used is generally given a higher priority to have the effective evaluation value of the parameter outputted first.

Then, the evaluation length (measurement area) is set at 12.5 mm (S310). This measurement length can also be changed.

Then, the total range of the specified measurement length is measured to obtain measurement data showing the surface roughness of the work.

Then, the parameter to be evaluated is calculated at the cutoff value of 0.08 mm. This parameter value is defined as P008. Since 31 evaluation ranges can be taken at this time, the maximum parameter value is obtained out of 31 parameter values (temporary evaluation values) calculated for each of the 31 evaluation ranges (S320).

Then, it is determined whether or not the maximum value of P008 falls within the range of Tables 1 to 3 (S330), and if this maximum value falls within the range, the maximum value is outputted as an effective evaluation value of roughness of the measurement area, with the cutoff value defined as 0.08 mm (S340).

On the other hand, in the case where the maximum value does not fall within the roughness range of P008, the parameter to be evaluated is calculated at the cutoff value of 0.25 mm. This parameter value is defined as P025. Since 10 evaluation ranges can be taken at this time, the maximum parameter value is obtained out of 10 parameter values (temporary evaluation values) calculated for each of 10 evaluation ranges (S350).

Then, it is determined whether or not the maximum value of P025 falls within the range of Tables 1 to 3 (S360), and if this maximum value falls within the range, the maximum value is outputted as an effective evaluation value of roughness of the measurement area, with the cutoff value defined as 0.25 mm (S370).

Similarly, in the case where the maximum value does not fall within the roughness range of P025, the parameter to be evaluated is calculated at the cutoff value of 0.8 mm. This parameter value is defined as P080. Since 3 evaluation ranges can be taken at this time, the maximum parameter value is obtained out of 3 parameter values (temporary evaluation values) calculated for each of 3 evaluation ranges (S380).

Then, it is determined whether or not the maximum value of P080 falls within the range of Tables 1 to 3 (S390), and if this maximum value falls within the range, the maximum value is outputted as an effective evaluation value of roughness of the measurement area, with the cutoff value defined as 0.8 mm (S400).

Similarly, in the case where the maximum value does not fall within the roughness range of P080, the parameter to be evaluated is calculated at the cutoff value of 2.5 mm. This parameter value is defined as P250. Since one evaluation ranges can be taken at this time, the parameter value (temporary evaluation value) is obtained as the maximum value (S410).

Then, it is determined whether or not the maximum value of P250 falls within the range of Tables 1 to 3 (S420), and if this maximum value falls within the range, the maximum value is outputted as an effective evaluation value of roughness of the measurement area, with the cutoff value defined as 2.5 mm (S430).

Furthermore, in the case where the maximum value does not fall within the roughness range of P250, 0.8 mm that is the most general value is defined as the cutoff value (S440).

If the effective evaluation value is determined in this way, there are cases where measurement processing can be completed at S340, S370 or S400, thus making it possible to determine the effective evaluation value without calculating the maximum values of all the parameter values (temporary evaluation values) of P008 to P250.

As described above, according to the roughness measuring method and roughness measuring apparatus according to the present invention, since a plurality of temporary evaluation values for each evaluation length corresponding to a plurality of cutoff values is calculated from measurement data, and the maximum value is obtained out of these temporary evaluation values to determine the effective evaluation value, the reliability of the effective evaluation value is high compared to conventional techniques in which the effective evaluation value is determined with one evaluation value, thus making it possible to measure the surface roughness of a work accurately.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A roughness measuring method, comprising the steps of:

specifying a measurement area of surface roughness of a work;

measuring a total range of the specified measurement area to obtain measurement data showing the surface roughness of the work;

using a filter having a plurality of predefined cutoff values to calculate, from the measurement data, a plurality of temporary evaluation values for an evaluation length corresponding to a first one of the plurality of predefined cutoff values, thereby obtaining a maximum value of the plurality of temporary evaluation values;

obtaining the maximum value as an effective evaluation value if the maximum value falls within a roughness range of a first one of the plurality of predefined cutoff values; and using a second one of the plurality of predefined cutoff values to obtain an effective evaluation value if the maximum value does not fall within the roughness range of the first one of the plurality of predefined cutoff values.

2. The roughness measuring method as defined in claim 1, wherein the second one of the plurality of predetermined cutoff values is larger than the first one of the plurality of predefined cutoff values.

3. A roughness measuring apparatus, comprising:

a stylus which comes into contact with a surface of a work;

a measurement area specifying device which specifies a measurement area of surface roughness of the work;

a measurement data obtaining device which moves the stylus across a total range of the measurement area specified by the measurement area specifying device to obtain measurement data showing the surface roughness of the work;

a maximum value obtaining device which uses a filter having a plurality of predefined cutoff values to calculate, from the measurement data obtained by the measurement data obtaining device, a plurality of temporary evaluation values for an evaluation length corresponding to a first one of the plurality of predefined cutoff values, thereby obtaing a maximum value of the plurality of temporary evaluation values; and an evaluation value outputting device which obtains the maximum value as an effective evaluation value if the maximum value obtained by the maximum value obtaining device falls within a roughness range of a first one of the plurality of predefined cutoff values, and uses a second one of the plurality of predefined cutoff values to obtain and output an effective evaluation value if the maximum value does not fall within the roughness range of the first one of the plurality of predefined cutoff values.

4. The roughness measuring apparatus as defined in claim 3, wherein the second one of the plurality of predefined cutoff values is larger than the first one of the plurality of predefined cutoff values.

* * * * *

UNITED STATES PATENT AND TRADEMARK OFFICE
CERTIFICATE OF CORRECTION

PATENT NO. : 6,696,697 B2 Page 1 of 1
DATED : February 24, 2004
INVENTOR(S) : Masato Enomoto It is certified that error appears in the above-identified patent and that said Letters Patent is hereby corrected as shown below:

Column 7,
Line 38, replace "predetermined" with -- predefined --.

Signed and Sealed this

Twenty-ninth Day of June, 2004

JON W. DUDAS
*Acting Director of the United States Patent and Trademark Office*